United States Patent [19]
Browne et al.

[11] Patent Number: 5,252,013
[45] Date of Patent: Oct. 12, 1993

[54] SELF-PLUGGING BLIND RIVET

[75] Inventors: Laurence A. Browne, Welwyn Garden City; Keith Denham, Welwyn; Raymond D. Lacey, Essendon, all of Great Britain

[73] Assignee: Avdel Systems Limited, Welwyn Garden City, England

[21] Appl. No.: 822,198

[22] Filed: Jan. 17, 1992

[30] Foreign Application Priority Data

Jan. 18, 1991 [GB] United Kingdom ............ 9101129.6

[51] Int. Cl.$^5$ .................. F16B 13/04; F16B 13/06
[52] U.S. Cl. ............................ 411/43; 411/38; 411/70
[58] Field of Search .............. 411/34, 36, 37, 38, 411/43, 55, 69, 70

[56] References Cited
U.S. PATENT DOCUMENTS

| | | | |
|---|---|---|---|
| 2,030,166 | 2/1936 | Huck | 411/34 |
| 2,030,167 | 2/1936 | Miller | 411/34 |
| 3,286,580 | 11/1966 | Jeal | 411/34 |
| 4,639,174 | 1/1987 | Denham et al. | 411/43 X |
| 4,958,971 | 9/1990 | Lacey et al. | 411/43 X |
| 4,988,247 | 1/1991 | Summerlin | 411/38 |

Primary Examiner—Neill R. Wilson
Attorney, Agent, or Firm—Oblon, Spivak, McClelland, Maier & Neustadt

[57] ABSTRACT

A self-plugging blind rivet, of the kind comprising a tubular body having a head and a shank which is deformed by means of a headed stem which is disposed in the body and pulled so as to form a blind head and, if necessary, to cause the shank to bulb so as to grip workpieces of lesser thickness than the maximum for which the rivet is designed, is so shaped and dimensioned as to avoid the need for a crimping or hardening operation to be performed on the shank. Thus the shank is made of uniform hardness, and has a waist and a tail portion, the waist being of reduced external diameter compared with the tail portion, and the tail portion having a length B and an external diameter D which are related to satisfy the expression $$B = mD + n$$

wherein
B is the length in millimeters, of the tail portion;
D is the external diameter, in millimeters, of the tail portion;
n is a length, in millimeters, of from 2.15 to 2.73 millimeters, and
m is a number from 0.373 to 0.527 inclusive.

10 Claims, 1 Drawing Sheet

SELF-PLUGGING BLIND RIVET

BACKGROUND OF THE INVENTION

This invention relates to a self-plugging blind rivet and more particularly a blind rivet of the kind comprising an elongate, generally cylindrical, stem having a radially enlarged head at one of its ends, and a tubular body having a shank, and a radially enlarged pre-formed head at one end of the shank for engaging one face of a workpiece, the stem extending through an axial bore in the body and projecting from the head end of the body, and the head of the stem abutting the shank at the other, or tail, end remote from the pre-formed head, whereby, on pulling the projecting stem and supporting the head of the body in order to set the rivet, a portion of the shank adjacent to the tail-end may be deformed to form a blind head for engaging an opposite, or "blind", face of the workpiece.

In order that a rivet, which is made of a length sufficient to accommodate work of a given maximum thickness, will also perform satisfactorily in workpieces having thicknesses in a range less than the maximum thickness for which the rivet is designed, a portion of the shank intermediate between the tail portion and the pre-formed head is shaped and dimensioned so that, under axial compression, it will collapse axially into an annular bulge or fold which can be forced into engagement with the blind face of a workpiece having a thickness less than the maximum for which the rivet is designed, and thus the workpieces can be fastened between the pre-formed head and the annular bulge, rather than the blind head.

One particularly successful and well-known type of rivet of the foregoing kind is sold under the Registered Trade Mark "AVEX", and has a shank which is initially of cylindrical external shape, and, during manufacture, a portion of the shank intermediate between the pre-formed head and the tail-end is crimped externally, so as to form a waist portion of reduced external diameter as compared with portions adjacent the ends of the shank, which promotes or facilitates the formation of the bulge at an appropriate position, and with an appropriate shape, during setting of the fastener.

The crimping of the shank is necessarily an individual operation in the manufacture of the rivet, and is performed after the fastener has been assembled by insertion of the stem into the bore of the body. Thus, the shank is crimped on to the stem, ensuring that the body will retain the stem and prevent their accidental separation, and during the crimping operation the stem supports the shank, and thus prevents any appreciable reduction in the internal diameter of the shank in the crimped portion, so that the internal diameter of the body remains substantially constant throughout the length of the bore.

The need to perform the crimping operation as an individual step in the manufacture of the rivet is onerous, and we have sought to avoid the need for such a step.

However, the crimping operation also has the effect of causing some work-hardening of the material in the crimped region of the shank. We have found that merely to form a body with a shape which imitates the shape of the crimped body, without actually making the waist portion harder than the rest of the shank, is not a satisfactory alternative to the established method of manufacture, because the behaviour of such a body during setting of the rivet is different from that of the conventionally produced rivet.

We have now found that, in order for a body having a waist portion which is not harder than the rest of the shank to work in a similar way to a body which has been crimped, it is necessary to maintain certain dimensional relationships between the parts of the body, and that these relationships are generally different from those of a crimped body of similar shape.

SUMMARY OF THE INVENTION

According to the present invention there is provided a self-plugging blind rivet comprising an elongate, generally cylindrical, stem having a radially enlarged head at one of its ends, and a tubular body having a shank, and a radially enlarged pre-formed head at one end of the shank, the stem extending through an axial bore in the body and projecting from the head end of the body, and the head of the stem abutting the other end of the shank remote from the pre-formed head, the shank having a tail portion adjacent the said other end, and a waist portion intermediate between the tail portion and the pre-formed head, the external diameter of the waist portion being smaller than that of the tail portion, wherein, the shank is uniformly hard throughout its length, and the relationship between the length of the tail portion and the external diameter of the tail portion is such as substantially to satisfy the expression:

$$B = mD + n$$

wherein
B is the length in millimeters, of the tail portion;
D is the external diameter, in millimeters, of the tail portion;
n is a length, in millimeters, of from 2.15 to 2.73 millimeters, and
m is a number from 0.373 to 0.527 inclusive.

BRIEF DESCRIPTION OF THE DRAWINGS

An embodiment of the invention will now be described, by way of example, with reference to the accompanying diagrammatic drawings in which.

DESCRIPTION OF THE PREFERRED EMBODIMENT

Figure 1:
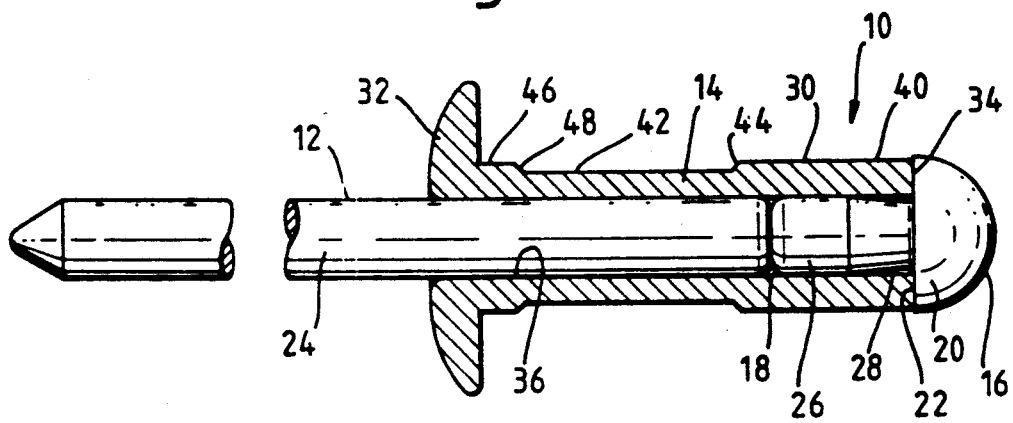
FIG. 1 is a side view, partly in section, of a self-plugging blind rivet according to the invention.

Referring first to FIG. 1 of the drawings, a self-plugging blind rivet 10 comprises a stem 12 and a body 14.

The stem 12 is formed of cold drawn mild steel, and is of elongate, generally cylindrical, shape, having an integral radially enlarged head 16 of mushroom shape at one end, and a breakneck 18 spaced a short distance from the head 16. The head 16 presents a part-spherical face 20 directed away from the stem, and a substantially annular abutment face 22 which faces towards the end of the stem remote from the head 16. In this embodiment, the abutment face is slightly undercut. The part of the stem between the breakneck 18 and the end remote from the head 16 is known as the stem-tail, and is indicated by the reference 24. The stem-tail 24 is elongate, and of generally constant diameter throughout its length, but may be provided over part of its length with a plurality of annular grooves to facilitate gripping and pulling of the stem, and may have a short taper to provide a lead-in at the end remote from the head 16.

Between the breakneck 18 and the head 16 the stem has a short portion 26 in which the diameter of the stem is reduced slightly, towards the head, through a short taper 28.

The body 14 is made of aluminium alloy, either by turning or by cold forging in which case, after forming, it is annealed so that the body is soft and of uniform hardness throughout. The body 14 comprises an elongate shank 30, and, at one end of the shank, a radially enlarged pre-formed head 32. The other end of the shank 30 is known as the tail end, and is indicated by the reference 34. The body 14 is tubular, having a bore 36 of constant diameter extending axially throughout the shank and the pre-formed head. In the assembled rivet, the stem 12 is disposed in the bore 36 so that the abutment face 22 of the enlarged head 16 of the stem abuts the tail end 34 of the body, and the stem-tail 24 projects from the bore beyond the pre-formed head 32 of the body. The stem is a push-fit in the bore of the body so that, once assembled, the parts remain together, ready for use, until required.

The shank 30 has a tail portion 40 adjacent to the tail end, the diameter of the tail portion establishing the nominal diameter of the rivet and the hole-size (that is the diameter of the hole in the workpiece) in which the rivet can most suitably be installed.

Between the tail portion 40 and the pre-formed head 32 is a cylindrical waist portion 42 of smaller diameter than the tail portion, the waist portion being joined to the tail portion through a short frusto-conical portion 44 having an apical angle of about 90°.

The shank in this embodiment has a short bush portion 46 between the waist portion 42 and the pre-formed head 32, the bush portion 46 having a diameter greater than that of the waist portion 42 and substantially the same as that of the tail portion 40. The bush portion is joined to the waist portion 42 through a short frusto-conical portion 48 having an apical angle of about 90°. The bush portion 46 is intended to enter a hole in the workpiece in which the rivet is to be installed, and to centre the rivet in the hole.

The bush portion 46 is not essential to the operation of the fastener as a fastener, since the waist portion 42, which has a diameter less than that of the tail portion 40, could be attached directly to the pre-formed head 32, but the provision of the bush portion serves a number of useful purposes, namely, it strengthens the attachment of the shank 30 to the pre-formed head 32, and it increases the distance between the pre-formed head 32 and the tail and waist portions 40, 42, and thus enables the fastener to accommodate work of greater thickness than would otherwise be possible.

Figure 2:
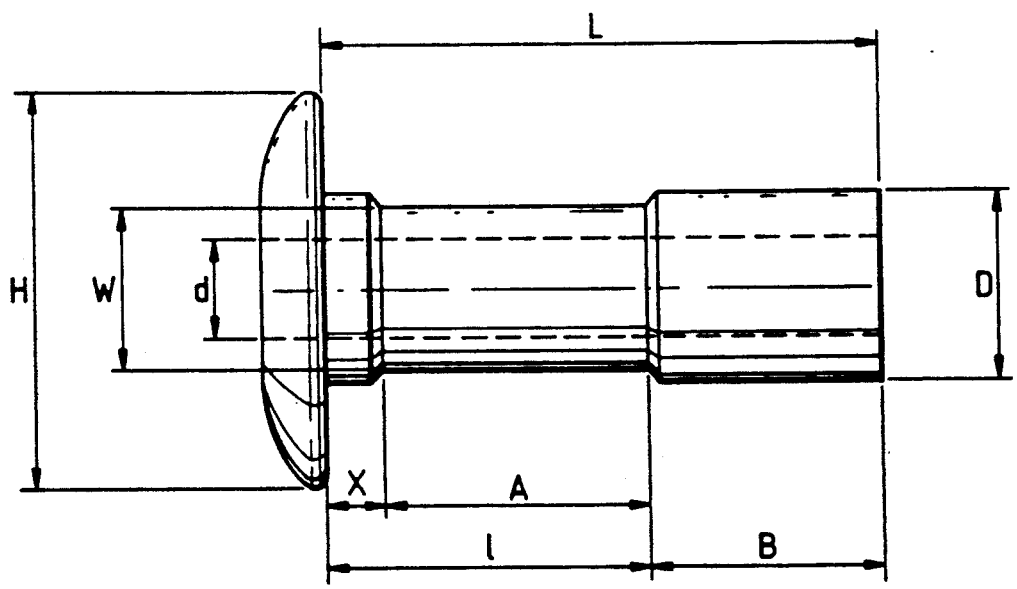
FIG. 2 is a side elevation of part of the rivet of FIG. 1, including references indicating dimensions of parts of the rivet.

Referring now to FIG. 2 of the drawings, there is shown the body 14 of the rivet of FIG. 1 on which the more important dimensions are indicated by reference letters, as follows:

L represents the overall length of the shank 30;

l represents the combined lengths of the bush portion 46, the frusto-conical portion 48, and the cylindrical waist portion 42;

X represents the combined lengths of the bush portion 46 and the frusto-conical portion 48;

A represents the length of the cylindrical waist portion 42;

B represents the length of the tail portion 40, including the length of the frusto-conical portion 44;

D represents the diameter of the tail portion 40;

W represents the external diameter of the waist portion 42;

d represents the diameter of the bore 36, and

H represents the diameter of the pre-formed head 32.

The significance of these dimensions will now be explained.

The length L of the shank 30 (the "underhead length"), is determined by the maximum grip required of the fastener, and must be such that L is equal to the sum of the maximum thickness of the workpieces to be fastened plus a sufficient length of tail portion adequate to project beyond the workpieces and then to be deformed to produce a blind head larger in diameter than the hole, The length B of the tail portion 40 including the portion 44 is, for a given diameter of rivet, constant over the range of grip lengths made in that diameter, and needs to be of adequate length to form a blind head but not appreciably longer because the stem head would pull through too far.

The length 1 (i.e. $\underline{L\text{-}B}$) is the length of the portion of the shank between the pre-formed head and the tail portion which enables the rivet (a) to accommodate a sheet thickness up to a predetermined maximum grip, and (b) by virtue of the waist portion 42 of length A, to accommodate sheet thicknesses less than the predetermined maximum.

The length A of the waist portion must be adequate to promote bulging of the waist portion under axial compression to form an annular bulge having a diameter larger than the hole in the work. The length A of the waist portion must be at least slightly greater than the difference between the diameter d of the bore in the waist portion and the hole diameter which, itself must be a clearance around the tail portion of diameter D. We prefer to make A three to three and a half times (D-d).

If, the length A of the waist portion is less than l, there will be an underhead bush portion of length X and as this may be, in this embodiment, of substantially the same diameter as the tail portion.

The bush portion is not appreciably deformed in use and will therefore necessitate that the work should have a minimum thickness substantially equal to the length X of the bush portion. Thus, the length X of the underhead bush portion determines the minimum grip of the fastener and it is obviously desirable that it should be substantially less than l.

As the shank is of uniform hardness throughout its length, it is necessary that the dimensions of certain parts of the shank be controlled so as to lie within certain specified relationships to those of certain other parts.

Thus the presence of the bush portion 46, acting as a spacer, increases the "minimum grip" of the fastener, that is to say, the minimum thickness of workpieces which the fastener is capable of accommodating.

The bush portion could be omitted, in which case the fastener could be made to grip a workpiece of substantially zero thickness.

The minimum grip of the fastener generally corresponds directly to the axial length of the bush portion.

The waist portion and the tail portion are the operative parts of the shank which, in co-operation with the pre-formed head, enable the workpiece to be fastened. The tail portion 40 is spaced from the pre-formed head 32 by a distance which depends principally on the combined lengths of the waist portion 42 and the bush portion when this is present, and it is this distance which determines the maximum grip of the fastener.

In workpieces of the maximum thickness which the fastener can accommodate, that is, the "maximum grip" condition, the workpiece is engaged by a blind head produced by deformation of the tail portion 40, and the waist portion 42 merely expands radially, as a result of being compressed axially to a shorter length, to fill the hole in which the fastener is installed. In workpieces having a thickness appreciably less than the maximum grip, and down to the minimum grip, the workpiece is engaged by a bulge or fold produced by axial collapse of the waist portion. In thicknesses of work approaching the maximum grip, there may be formed a cooperative alliance of both blind head and bulged waist portion which together serve to fasten the workpiece, the change from one form of engagement to the other being indeterminate.

The range between minimum and maximum grip is determined primarily by the length of the waist portion 42, although minor influences on this range will also be exerted by the external and internal diameters of the waist portion.

Thus, within limits, the longer the waist portion, the wider will be the range of thicknesses which can be accommodated. However, if the waist portion is made too long, it becomes unstable under axial compression, particularly in relatively thin workpieces, and then may not form a symmetrical annular bulge or fold.

We have found that, when the shank 30 is relatively soft throughout its length (in contrast to the known rivets, in which the waist portion is relatively harder than the rest of the shank), it is desirable to make the waist portion slightly shorter than was the case in the known rivets having a hardened waist, in order to ensure stability of the waist during setting of the rivet.

Furthermore, we have also found that it is necessary to make the tail portion of a shank having uniform hardness slightly longer than that of a shank having a hardened waist portion.

More particularly, we have found that, if the tail portion 40 is made too long, the head 16 of the stem 12 enters too easily and passes too far along the tail portion, and, as a result, fails to produce a deformation of the tail portion appropriate to constitute a satisfactory blind head.

Equally important is the fact that, if the tail portion 40 is too short, the deformation on pulling the stem is inadequate to constitute a satisfactory blind head.

We have found that, for rivets of appropriate size and intended to be installed in holes having a diameter of from about 3.0 mm to about 5.0 mm (that is to say, nominal diameters of from about ⅛ inch to about 3/16 inch), the relationship between the axial length of the tail portion and its external diameter should be such as substantially to satisfy the expression $$B = mD + n$$

wherein B is the axial length, in millimeters, of the tail portion, D is the external diameter, in millimeters, of the tail portion, m is a number from 0.373 to 0.527, and n is a length of from 2.15 millimeters to 2.68 millimeters.

Such rivets are made in standard sizes suitable for installation in holes having nominal diameters of 3.2 mm, 4.0 mm and 4.8 mm for work following metric practice, or of ⅛ inch, 5/32 inch and 3/16 inch for work following imperial practice.

The external diameter of the tail portion is, of course, made slightly smaller than the diameter of the hole into which it is to be installed so that the shank of the rivet is a clearance fit in the hole.

Furthermore, for each standard diameter, the rivets may be made in a variety of lengths intended to accommodate various ranges of thickness of workpiece. The length may be adjusted by adjusting the length of the waist portion, but preferably is adjusted by providing a bush portion of appropriate length.

The invention will now be illustrated more specifically by reference to FIG. 2 of the drawings, and the actual dimensions of some specific embodiments, taken by way of example, as shown in the following table:

| EXAMPLE | DIMENSIONS (millimetres) | | | | | | | |
|---|---|---|---|---|---|---|---|---|
| | L | X | A | B | D | W | d | H |
| 1 | 9.14 | 0.25 | 5.08 | 3.81 | 3.07 | 2.82 | 1.7 | 6.5 |
| 2 | 10.72 | 1.83 | 5.08 | 3.81 | 3.07 | 2.82 | 1.7 | 6.5 |
| 3 | 12.32 | 3.43 | 5.08 | 3.81 | 3.07 | 2.82 | 1.7 | 6.5 |
| 4 | 10.72 | 0.43 | 6.10 | 4.19 | 3.86 | 3.56 | 2.08 | 8.0 |
| 5 | 11.56 | 0.0 | 6.99 | 4.57 | 4.76 | 4.39 | 2.79 | 10.0 |
| 6 | 16.33 | 4.77 | 6.99 | 4.57 | 4.76 | 4.39 | 2.79 | 10.0 |

In the above examples, the rivets of Examples 1, 2 and 3 are all of nominally ⅛ inch diameter size, and are intended for installation in holes of ⅛ inch (3.2 mm) diameter.

The rivet of Example 1 includes a bush portion of 0.25 mm length, and is suitable for use in sheets having a range of thickness of from 0.25 mm to 4.75 mm.

The rivets of Examples 2 and 3 have longer bush portions, and are suitable for use in sheets of correspondingly greater thickness.

The rivet of Example 4 is of nominally 5/32 inch diameter size, and is of correspondingly greater diameter and strength than those of Examples 1, 2 and 3. The rivet of Example 4 includes a short bush portion of 0.43 mm length, and is suitable for use in sheets having a thickness in the range of from 0.4 mm to 6.35 mm.

The rivet of Example 5 is of nominally 3/16 inch diameter size, and has no bush portion, the waist portion being contiguous with the pre-formed head. The rivet of Example 5 is suitable for use in sheets in a range of thickness from negligible thickness to 6.3 mm.

Example 6 is similar to Example 5, except that it includes a bush portion of 4.77 mm length which increases both the minimum and maximum grip, so that the rivet is suitable for use in sheets in a range of thickness from 4.8 mm to 11.1 mm.

In the foregoing examples, the values given for the length of the tail portion including the frusto-conical portion 44, denoted by B, are believed to be the optimum values for this dimension in a rivet having a tail portion of the stated diameter D.

Thus, in the case of the specific Examples, the values of m and n in the expression B=mD+n have the specific values m=0.456, and n=2.41

All the rivets of the foregoing Examples therefore substantially satisfy the expression B=mD+n as hereinbefore defined.

The following explanation is offered for the fact that, in the expression B=mD+n, according to the broad aspect of the invention, m and n have a range of values.

For any given diameter of rivet, there is a range over which the length B of the tail portion may be varied without departing sufficiently from the optimum to cause the rivet to fail to perform satisfactorily over the whole range of thicknesses of workpiece for which use of the rivet is recommended.

For rivets of the three diameters D represented by the Examples, we have established experimentally, and by subjective judgement, the upper and lower limits for the length B of the tail portion, and it is from the results of such determinations that the ranges of value for m and n have been established. The ranges over which the value of B may be varied for each of the three diameters D, according to our determinations, are tabulated below (dimensions in millimeters):

| Diameter D | Range of value for length B |
|---|---|
| 3.07 | 3.30 to 4.35 |
| 3.86 | 3.59 to 4.76 |
| 4.76 | 3.93 to 5.24 |

From this it has been established that the upper limit of B is $0.527 D + 2.73$, and the lower limit of B is $0.373 D + 2.15$ The following is a first installation example of the installation of the rivet 10 (FIG. 1) of Example 2 in a known sheet workpiece (not shown) having a thickness of 6.3 mm, which is the maximum thickness of a workpiece for which the rivet of this example is suited.

The rivet is first inserted into a hole in the workpiece having a diameter of $\frac{1}{8}$ inch (3.2 mm), previously formed in the sheet, so that the pre-formed head abuts one face of the sheet and the tail portion and some of the waist portion of the shank project beyond an opposite face of the sheet.

A conventional breakstem rivet-setting tool (not shown) is then used to grip and pull the projecting stem-tail 24 (FIG. 1) while supporting the rivet body against movement by abutting the pre-formed head 32. This causes a progressive deformation of the body, due to the axial compression of the body between the abutting tool and the stem head 16.

The deformation of the rivet is such that the waist portion of the body becomes axially shortened, and barrel-shaped due to a radial expansion which is greatest midway between its ends, and least at each of its ends where it is connected to the bush portion and the tail portion respectively. At the same time as this initial deformation of the waist portion, the tail portion also becomes slightly shorter and increases in diameter, while the stem head bites into the tail end of the shank. With continued application of force by the tool, the waist portion, and also the bush portion, expand sufficiently to fill the hole in the workpiece sheet, taking up the clearance which existed initially, and the tail portion deforms further, becoming barrel shaped so as to have a diameter greater than that of the hole in the sheet.

Once the hole in the workpiece is substantially filled, the applied force becomes increasingly operative to cause deformation of the tail portion, causing the tail portion to be expanded further, so as to constitute a blind head and to be forced firmly against the adjacent opposite face of the sheet. The stem head enters still further into the tail portion until the build up of material between the stem head and the sheet presents sufficient resistance to further movement of the stem head that the breakneck 18 will fracture if further force is applied.

The workpiece will then be firmly gripped between the pre-formed head 32 and the blind head.

It is usual to continue pulling until the breakneck fractures, allowing the stem-tail to be discarded, while the stem head remains locked in the deformed body to serve as a plug for the bore and to contribute shear strength to the rivet.

The rivet of Example 2 may also be used to fasten a sheet, or a plurality of sheets or other members, having a thickness appreciably less than the maximum thickness for which the rivet is designed, down to a minimum thickness of 1.8 mm.

The behaviour of the rivet in sheets of less than the maximum thickness is different from that in sheets of the maximum thickness, the more so as the thickness approaches the minimum for which the rivet is designed. The following is a second installation example of the installation of the rivet 10 (FIG. 1) of Example 2 in a workpiece sheet (not shown) having a thickness of 1.8 mm, which is the minimum thickness for which the rivet is suited.

In comparison with the first installation example, the only initial difference is that the sheet is thinner than the sheet of the first installation example, the rivet and the hole diameter being the same.

The rivet is inserted into the hole of the sheet so that the pre-formed head abuts one face of the sheet, and the tail portion and a substantial part of the waist portion then project beyond the opposite face.

A rivet setting tool is then used, as previously explained, to deform and set the rivet.

The deformation is similar to that of the first installation example, with the waist portion becoming barrel-shaped and a slight deformation of the tail portion occurring.

However, as the waist-portion is not within the thinner sheet, it is not constrained by the sheet and, with continued application of force, the waist is deformed into a large bulb having a diameter substantially greater than that of the hole. Some deformation of the tail portion is also evident at this stage.

With continuing application of force, the bulb collapses into an annular fold which is forced towards the sheet, and the tail portion also becomes axially compressed and thereby radially expanded.

Eventually, the annular fold is forced firmly into contact with the sheet, resisting further deformation, and the stem head 16 bites further into the tail portion.

Further application of increasing force finally will cause rupture of the breakneck, leaving the fastener set, as previously explained.

We claim:

1. A self-plugging blind rivet comprising an elongate, generally cylindrical, stem having a radially enlarged head at one of its ends, and a tubular body having a shank, and a radially enlarged pre-formed head at one end of the shank, the stem extending through an axial bore in the body and projecting from the head end of the body, and the head of the stem abutting the other end of the shank remote from the pre-formed head, the shank having a tail portion adjacent the said other end, and a waist portion intermediate between the tail portion and the pre-formed head, the external diameter of the waist portion being smaller than that of the tail portion, wherein the shank is uniformly hard throughout its length, and the relationship between the length of the tail portion and the external diameter of the tail portion is such as substantially to satisfy the expression:

$$B = mD + n$$

wherein:
- B is the length, in millimeters, of the tail portion;
- D is the external diameter, in millimeters, of the tail portion;
- n is a length, in millimeters, of from 2.15 to 2.73 millimeters, and
- m is a number from 0.373 to 0.527 inclusive.

2. A self-plugging blind rivet as claimed in claim 1, wherein m is the number 0.456, and n is 2.41 millimeters.

3. A self-plugging blind rivet as claimed in claim 1, wherein the body includes a bush portion intermediate between the waist portion and the pre-formed head.

4. A self-plugging blind rivet as claimed in claim 1, wherein D is 3.07 mm and B is 3.81 mm.

5. A self-plugging blind rivet as claimed in claim 4, wherein the waist portion has a diameter of 2.82 mm 6. A self-plugging blind rivet as claimed claim 1, wherein D is 3.86 mm, and B is 4.19 mm.

7. A self-plugging blind rivet as claimed in claim 6, wherein the waist portion has a diameter of 3.56 mm.

8. A self-plugging blind rivet as claimed in claim 1, wherein D is 4.76 mm, and B is 4.57 mm.

9. A self-plugging blind rivet as claimed in claim 8, wherein the waist portion has a diameter of 4.39 mm.

10. A self-plugging blind rivet comprising: an elongate, generally cylindrical, stem having a radially enlarged head at one of its ends, and a tubular body having a shank, and a radially enlarged pre-formed head at one end of the shank, the stem extending through an axial bore in the body and projecting from the head end of the body, and the head of the stem abutting the other end of the shank remote from the pre-formed head, the shank having a tail portion adjacent the said other end, and a waist portion intermediate between the tail portion and the pre-formed head, the external diameter of the waist portion being smaller than that of the tail portion, wherein the shank is uniformly hard throughout its length, and the relationship between the length of the tail portion and the external diameter of the tail portion is such as substantially to satisfy the expression:

$$B = mD + n$$

wherein:
- B is the length, in millimeters, of the tail portion;
- D is the external diameter, in millimeters, of the tail portion in the range of 3.07 millimeters to 4.76 millimeters;
- n is a length, in millimeters, of from 2.15 to 2.73 millimeters, and
- m is a number from 0.373 to 0.527 inclusive.

* * * * *